Figure 1:
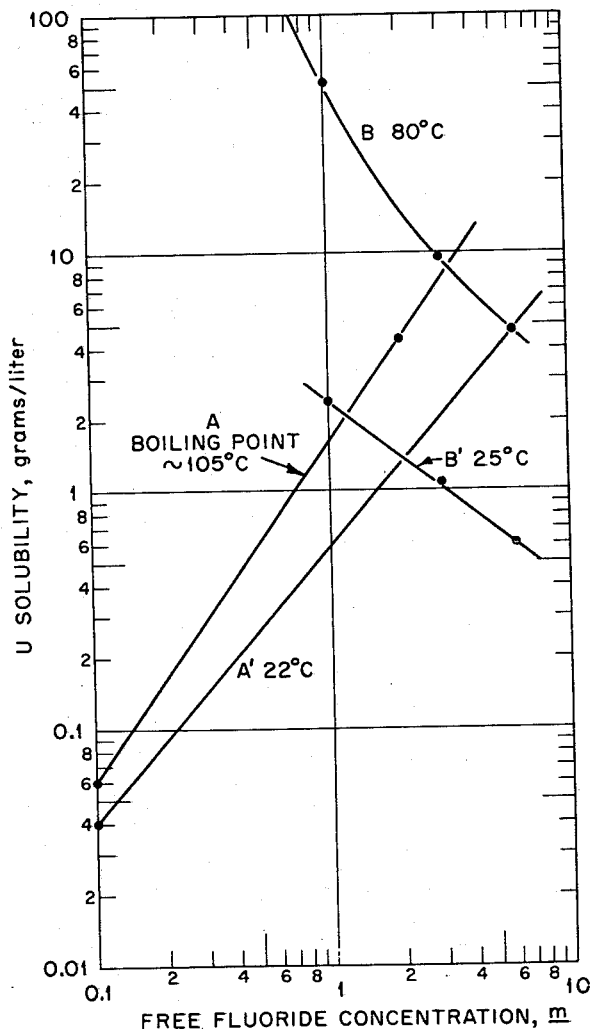

July 18, 1961    T. A. GENS    2,992,886
METHOD FOR DISSOLVING ZIRCONIUM-URANIUM COMPOSITIONS Filed March 7, 1960    2 Sheets-Sheet 1

INVENTOR.
Theodore A. Gens

BY

ATTORNEY

INVENTOR.
Theodore A. Gens

United States Patent Office 2,992,886
Patented July 18, 1961

2,992,886
METHOD FOR DISSOLVING ZIRCONIUM-URANIUM COMPOSITIONS
Theodore A. Gens, Oak Ridge, Tenn., assignor to the United States of America as represented by the United States Atomic Energy Commission
Filed Mar. 7, 1960, Ser. No. 13,405
11 Claims. (Cl. 23—14.5)

The present invention relates to a method for dissolving zirconium-uranium compositions. More particularly, it relates to a method for dissolving neutron irradiated zirconium-uranium compositions to form a stable solution from which uranium and other values can be extracted by a liquid-liquid solvent extraction process.

The physical and nuclear properties of zirconium and its alloys make it an excellent material of construction for use in nuclear reactors. A particularly useful application of zirconium is as a zirconium-uranium alloy; alloys of zirconium containing uranium clad with a high-temperature corrosion resistant material such as zirconium have found wide use as solid fuel elements in nuclear reactors operating at thermal and intermediate neutron energies.

As with other fuel elements, zirconium-uranium fuel elements must be periodically removed from an operating nuclear reactor for reprocessing. One of the basic reasons for the periodic removal of irradiated fuel from a reactor is to prevent loss of reactivity in the reactor due to the accumulation of fission product poisons and to separate and recover unburnt fuel. A reactor fuel element burns only a fraction of its fuel content before it must be removed from the reactor. Hence, many cycles of burnup and reprocessing are necessary to utilize the equivalent of a single fuel charge. A separation process for fuel recovery must therefore be capable of high yields and low cost per cycle.

One of the principal classes of separation processes for nuclear fuels containing uranium is that in which solvent extraction is the main separation operation. For irradiated fuel elements, the principal steps in solvent extraction include a dissolution step in which at least the fuel portion of the irradiated fuel element is dissolved in an aqueous medium to provide an aqueous feed solution which will be suitable for liquid-liquid extraction. The aqueous feed is then contacted with a selective organic solvent which extracts fissionable and fertile values therefrom, leaving a large percentage of radio-active fission products behind. Further processing of the enriched organic phase permits concentration and further purification to obtain a product having a suitably low level of radioactivity. The final product can then be refabricated into fuel elements for reuse in a nuclear reactor.

It is a general object of this invention to prepare a stable feed solution from a neutron irradiated zirconium-uranium composition which is suitable as an aqueous feed for a liquid-liquid solvent extraction process.

As conducive to a clearer understanding of the present invention, a brief discussion of the problems involved in forming an aqueous feed solution of the kind described above will be helpful. An optimum requirement is the formation of a stable solution. By this is meant a solution in which all of its solute ingredients are soluble in a homogeneous liquid phase over a relatively wide range of concentration and over a relatively large temperature range. A stable feed solution is necessary for efficient liquid-liquid extraction. If any material in solution tends to precipitate, it will usually result in a concomitant co-precipitation of uranium values. Similarly, if two or more aqueous phases tend to form, the uranium and/or other values may be distributed into the several phases. In either case, the efficiency of the subsequent solvent extraction will be reduced. A stable solution is also necessary to avoid or at least reduce the possibility of forming a critical mass. In any process in which significant quantities of fissionable material are handled, there is danger of formation of an accidental and unscheduled nuclear chain reaction. The probability of such an incident occurring can be reduced to a minimum if the fissionable material can be handled in one physical state, such as in solution rather than in two or more states such as would be formed where the uranium exists both in solution and as a slurry or precipitate. Further, it is important that the volume of the aqueous feed solution be minimal while at the same time containing a maximum quantity of disolved uranium. Large volumes of uranium-bearing feed solutions result in large volumes of radioactive waste solutions. As noted, the solution is formed by dissolving the solid uranium-bearing fuel element. In this connection, it is desirable that the process should be characterized by a high but controllable dissolution rate and should be adaptable to forming a solution having a uranium content such that alloys varying from as little as 1 to as much as 15 percent by weight uranium can be dissolved without subsequent precipitation. And finally, the over-all dissolution process should be characterized by a minimum number of chemical reagents and process operations to produce the desired solution.

There are a number of presently known processes for dissolving zirconium-uranium compositions. Each of them, however, lacks one or more of the criteria mentioned previously. For example, nitric acid will effect dissolution of uranium quickly to form a solution of uranyl nitrate. However, when zirconium-uranium alloys containing less than 75 weight percent uranium are treated with nitric acid, no dissolution occurs. Some zirconium-uranium alloys can be dissolved in nitric acid, but the dissolution process is often accompanied by violent explosions. An aqueous solution of hydrofluoric acid has been used to dissolve zirconium-uranium alloys. However, the solubility of the resultant uranium tetrafluoride is exceeded in the final dissolver solution if aqueous hydrofluoric acid is used to dissolve uranium-zirconium alloys containing more than about 1 weight percent uranium; furthermore, the resultant solution is highly corrosive to most materials of construction.

It is therefore a principal object of the present invention to provide a stable uranium-zirconium solution and a process for forming said solution. A further object of this invention is to provide a process for forming a stable solution of uranium from solid zirconium-uranium compositions. Another object of this invention is to provide a process for forming a stable solution of uranium from a neutron irradiated zirconium-uranium alloy.

With these and other objects in mind, the present invention comprises a method of recovering uranium values from a neutron irradiated uranium composition where the uranium is clad, alloyed or mixed with zirconium, comprising the steps of contacting said composition with at least a 4 molar aqueous solution of ammonium fluoride at a temperature in the range 100° C. to 110° C. to dissolve said zirconium, adding a peroxide to said solution, in incremental amounts, throughout the period of said dissolution to convert said uranium to a soluble uranyl salt, adding a sufficient amount of nitric acid to the resultant solution to form a stable solution of uranyl nitrate and thereafter recovering said uranium and other values from said uranyl nitrate solution by solvent extraction.

The compositions which may be treated in accordance with this invention include uranium metal clad with zirconium metal or alloy, such as Zircaloy. However, this invention can be used with maximum advantage to form a stable solution from uranium alloys clad with zirconium metal or an alloy thereof.

The dissolution of zirconium in boiling ammonium fluoride is thought to proceed according to the following equation:

$$Zr + 6NH_4F \rightarrow (NH_4)_2ZrF_6 + 4NH_3 + 2H_2 \qquad (1)$$

This method of dissolving zirconium, without simultaneously dissolving uranium, has previously been used for decladding reactor fuel elements. The selective dissolution of zirconium cladding from reactor fuel elements in a solution of ammonium fluoride is disclosed in a paper by J. L. Swanson in volume 17 of the Second International Conference on the Peaceful Uses of Atomic Energy, 1959, pages 154 to 161. Rapid and complete dissolution of zirconium can be achieved by contacting the zirconium with a boiling solution of ammonium fluoride in the range 4 to 8 molar. For large scale processing, the presence of hydrogen gas, as shown in the above equation, is objectionable because of the explosive nature of hydrogen-air mixtures. The addition of small amounts, up to 1 molar, of ammonium nitrate to the ammonium fluoride solution has been found to minimize the formation of hydrogen. It has also been found that under the same conditions which promote rapid and complete zirconium dissolution, some uranium as metal, oxide, or alloy, is converted to ammonium uranous fluoride, a uranium salt which is sparingly soluble in zirconium-ammonium fluoride solutions.

As opposed to such a decladding procedure, I provide, in accordance with my invention, a process for dissolving zirconium-uranium alloys which yields a stable solution of zirconium and uranium, involving a minimum number of operations from which uranium and fertile values may be recovered by liquid-liquid solvent extraction. A principal advantage of my invention is illustrated in FIG. 1, which is a graph showing the variation of solubility of uranium in the +4 and +6 oxidation states respectively, in zirconium-ammonium fluoride solutions with the free fluoride concentration of the solutions. Curves A and A' show the concentration of uranium as ammonium uranous fluoride at 22° C. and at about 105° C., respectively, as a function of the free fluoride concentration in the solution; curve B' shows the enhanced solubility of the uranium on oxidizing the uranium to +6 oxidation state at 80° C. in solution. The markedly greater solubility of the uranium +6 solutions, especially at the low free fluoride concentrations, is especially to be noted. After a zirconium-uranium fluoride solution has been obtained, it is mixed with nitric acid to convert the uranium to organic extractable nitrate salts.

A nitric-acid solution containing free fluoride is extremely corrosive and, in order to reduce its corrosivity, an inorganic salt such as aluminum nitrate is added to form a soluble complex fluoride. The more aluminum nitrate needed, the higher will be the volume of aqueous radioactive waste resulting from solvent extraction. It is, therefore, apparent that a process which can operate with a minimum free fluoride content can still be capable of maximum uranium solubility is extremely advantageous. The free fluoride concentration is defined as: Total fluoride concentration—6 times the zirconium concentration where concentration may be expressed in moles.

In carrying out one modification of my invention, I contact a zirconium-uranium alloy with a boiling solution of ammonium fluoride, i.e., at a temperature in the range 100–110° C., while periodically adding hydrogen peroxide, for a time sufficient to completely dissolve the alloy at a practically high dissolution rate to yield a final solution having a molar ratio of total fluoride to zirconium of at least 6. It has been found that for a high dissolution rate, the concentration of ammonium fluoride should be about 4 to 6 molar. At lower concentrations complete alloy dissolution can occur but the dissolution rate is impractically low. At higher concentrations an insoluble zirconium salt begins to form and this, too, results in an impractically low dissolution rate.

During initial partial dissolution of the alloy prior to the introduction of any hydrogen peroxide, the color of the ammonium fluoride solution changes from colorless to green, indicating oxidation of the uranium to the +4 oxidation state. The addition of a peroxide, preferably hydrogen peroxide, in incremental amounts, to the heated solution of ammonium fluoride in which the uranium-zirconium alloy is being dissolved converts all of the uranium to a soluble uranyl salt, i.e., a uranium salt in the +6 oxidation state. The desired conversion can be followed visually by noting the change in color of the solution from green to yellow, indicating that all uranium in the solution has been converted to a soluble uranyl salt. The solution may regain a green color within a few minutes after the hydrogen peroxide addition, due to the production of more ammonium uranous fluoride by the continuing dissolution and/or the reduction of the soluble ammonium uranyl fluoride by the dissolving alloy. However, when sufficient hydrogen peroxide has been added at the end of dissolution, the color will change permanently to yellow, indicating complete conversion to U(+6). To insure complete conversion of all ammonium uranous fluoride (+4) to ammonium uranyl fluoride (+6), it is preferable to add sufficient hydrogen peroxide throughout the course of dissolution such that it would yield a final solution about 0.1 molar in hydrogen peroxide had no peroxide been consumed. With a final solution containing appreciably more peroxide, there is risk that an insoluble uranium peroxide will form.

The exact amount of hydrogen peroxide to be added to accomplish complete conversion of the uranium to a uranyl fluoride cannot, for several reasons, be accurately predicted in advance. In the first place, it should be noted that the hydrogen peroxide is rapidly decomposed by the heated solution. Furthermore, the amount and character of the other ingredients will vary from solution to solution, each ingredient reacting at least to some extent with the hydrogen peroxide. I have found that at least about a 200 percent stoichiometric excess of hydrogen peroxide must be added during dissolution to completely convert and maintain the uranium as U(+6) in the resultant solution, the stoichiometry being determined from the following equation:

$$NH_4UF_5 + 2NH_4F + H_2O_2 \rightarrow (NH_4)_3UO_2F_5 + 2HF \qquad (2)$$

The exact nature of uranyl salt formed in solution is not known. It is, however, reasonable to assume that the salt is ammonium uranyl fluoride as represented in the Equation 2.

Figure 2:
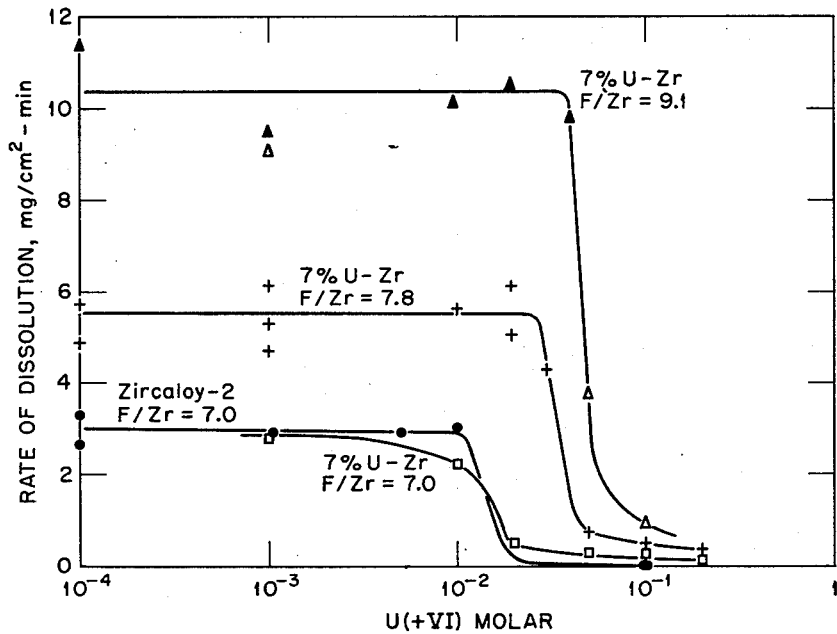

While a stable solution of zirconium and a soluble uranyl salt can be obtained in accordance with my invention, I have discovered that if uranyl salt is present in solution in excess amounts, it will reduce the zirconium dissolution rate to an impractically low level. The effect of uranyl on the zirconium rate will be evident from FIGS. 2 and 3. FIG. 2 is a graph showing the change in zirconium dissolution rate in ammonium fluoride solutions as a function of the concentration in moles of uranium in the +6 oxidation state, and of the molar ratio of total fluoride to zirconium in solution. These curves were obtained by dissolving zirconium-uranium alloy specimens containing 7 weight percent uranium in ammonium fluoride solutions to which were added varying amounts of uranyl fluoride in the range 0.0001 to 0.1 M. The initial solutions were adjusted to yield a final zirconium solution having a total fluoride to zirconium mole ratio in the approximate range 7–9. All solutions were adjusted to 0.1 M in $H_2O_2$ to insure no reduction of the uranyl ion. The alloy specimens were then immersed in these solutions and removed after 10 minutes to measure alloy dissolution rates. To show that the uranium in the uranium-zirconium alloy was not responsible for the reduction in dissolution rate at the higher concentrations in solution of U(+6), a zirconium alloy, Zircaloy-2, (a zirconium-tin alloy) was dissolved under the same conditions. The results are shown in FIG. 2. It will be seen that the Zircaloy-2 and the 7 percent uranium-zirconium alloy dissolution rates are relatively independent of U(+6) concentration up to $10^{-2}$ molar, but do depend on the fluoride to zirconium mole ratio of the zirconium solution.

Figure 3:
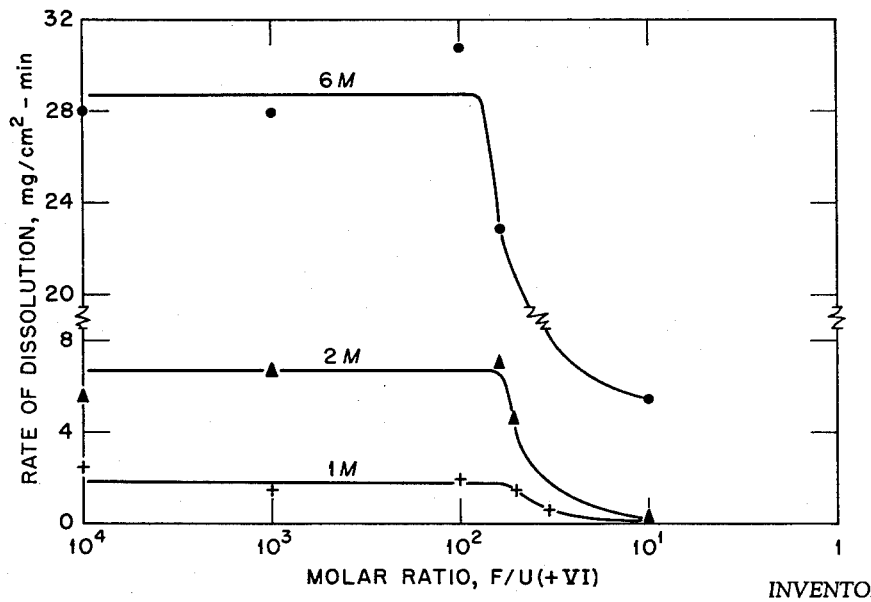

The dependence of the uranium-zirconium alloy dissolution rate in 1–6 M ammonium fluoride on the total free fluoride to uranyl fluoride ratio is shown in the curves of FIG. 3. It will be seen that the alloy dissolution rate is fairly constant until the total fluoride-uranyl mole ratio reaches a value of about 60, at which point a sharp drop occurs. A similar effect on the alloy dissolution rates occurs with alloys containing as little as 1 percent or as much as 15 percent uranium, by weight.

It will therefore be apparent that for complete alloy dissolution at a maximum dissolution rate the molar ratio of total free fluoride to uranyl (U+6) provided by the particular ammonium fluoride dissolvent should have a value of at least 60 using at least a 4 molar aqueous ammonium fluoride dissolving solution. To insure a free fluoride to uranyl (U+6) of at least 60 for zirconium alloys containing 10 per cent by weight uranium, the dissolved alloy solution should have a fluoride to zirconium mole ratio of about 9; for zirconium alloys containing about 1 percent uranium, the alloy solution should have a zirconium to free fluoride mole ratio of at least about 6.

After the zirconium-uranium solution has been formed, it is mixed at a temperature in the range 50 to 110° C. with a sufficient volume of nitric acid to convert the uranium to the organic extractable uranyl nitrate. Aluminum nitrate or other inorganic nitrate is also added in an amount sufficient to complex the free fluoride in solution and provide any required salting action for the subsequent solvent extraction. The resultant solution is cooled to ambient temperature and is now ready for use as an extraction feed solution.

Several well-known solvent extraction procedures may be used to extract uranium and fertile values from the resultant feed solution. One such process is disclosed in an article by D. G. Reid, C. E. Stevenson, R. B. Lemon and F. K. Wrigley, entitled "Reprocessing of Fuel Containing Zirconium," which appears in the Second International Conference on the Peaceful Uses of Atomic Energy, volume 17, U.N., Geneva, 1958, page 145.

These feed solutions have been found to be stable over wide changes in temperature and for an extended period of time. For example, feed solutions prepared in accordance with the present invention containing about 1 M nitric acid have been heated for one hour at the reflux temperature and stored for several weeks at 25° C. without precipitation.

The following example illustrates a specific embodiment of my invention.

EXAMPLE

Samples comprising coupons from a zirconium-uranium alloy containing 7 percent by weight zirconium were immersed in an aqueous solution of 5.5 molar ammonium fluoride containing a small amount of ammonium nitrate. The solutions were heated to the boiling temperature of approximately 105° C. An aqueous solution of hydrogen peroxide was added to the heated solutions throughout the period of alloy dissolution. After the alloy samples had completely dissolved and the required amount of nitric acid and aluminum nitrate were added, the solutions were cooled to ambient temperature without precipitate formation. The results from two typical runs are tabulated in Table I below.

This invention finds particular use in reprocessing spent neutron-irradiated zirconium-uranium alloy fuel compositions containing as much as 15 percent, by weight, uranium to form a stable solvent extraction feed solution, where the uranium content is enriched with respect to its normal isotopic abundance of uranium-235.

An extremely useful advantage resulting from my invention is the decreased corrosive action of ammonium-hydrogen peroxide solutions on the common materials of construction used in dissolver vessels and other apparatus for reprocessing neutron-irradiated zirconium-uranium compositions. A comparison of the corrosion rate of these materials in 6 molar ammonium fluoride solutions vs. 6 molar ammonium fluoride solutions containing hydrogen peroxide (0.03 M) is shown in Table II below.

Table I

| Sample weight (g.) | $H_2O_2$ (moles) | $NH_4NO_3$ (moles) | (Initial) $NH_4F$ conc. (M) | (Final) ratio F/Zr (M) | (Final) U conc. (M) | Complete dissolution time (hr.) | Average dissolution rate (mils/hr.) |
|---|---|---|---|---|---|---|---|
| 1.63 | 0.0024 | 0.0048 | 5.5 | 8.25 | 0.02 | 0.5 | 140 |
| 1.51 | 0.0025 | 0.0075 | 5.5 | 8.25 | 0.02 | 0.67 | 104 |

Table II

| Material composition (percent by weight) | Contact time, hrs. | Corrosion rate, mils per month | |
|---|---|---|---|
| | | $6 M NH_4F-$ $0.3 M NH_4NO_3$ | $6 M NH_4F-$ $0.3 M NH_4NO_3$ $+0.03 M H_2O_2$ |
| Hastelloy F | 3 | 7.3 | 2.3 |
| 21–23 Cr | 6 | 7.1 | 1.7 |
| 44–47 Ni | 9 | 5.0 | 1.4 |
| 5.5–7.5 Mo | | | |
| 1.75–2.5 Cb+Ta | | | |
| 309S Cb | 3 | 8.7 | 0.7 |
| 22–24 Cr | 6 | 6.1 | 0.6 |
| 12–15 Ni | 9 | 4.6 | 0.8 |
| 2(max) Mn | | | |
| 1(max) Si | | | |
| .8(max) Cb | | | |
| .08(max) C | | | |
| Ni-o-nel | 3 | 6.0 | 0.8 |
| Proprietary alloy containing Ni, Cr and Fe. | 6 | 5.9 | 1.0 |
| | 9 | 4.8 | 1.7 |

The improved corrosive resistance of the peroxide containing solution is clear-cut.

While the above discussion has illustrated the use of hydrogen peroxide to form a stable solution suitable for solvent extraction, it is within the scope of my invention to use other peroxides such as inorganic and organic peroxides for the same purpose. In such cases the choice of peroxides should be governed to eliminate those peroxides which may change the pH of the solution to basic values. Also, organic peroxides which may react violently in the solutions, such as aromatic peroxides, should be avoided.

Since many embodiments may be made of the process hereinbefore described and since many variations of this process may occur to those skilled in the art, it will be clearly understood that the scope of this invention is not to be limited to the particulars disclosed therein, but is to be defined by the following claims.

I claim:

1. In a method for treating a zirconium-uranium composition to form a stable solution from which uranium and other values may be extracted, the steps which comprise contacting said composition with at least a 4 molar aqueous solution of ammonium fluoride at a temperature of about 100° C., adding a peroxide, in incremental amounts, to the heated solution throughout the period of dissolution until all of the uranium has been converted to soluble uranyl salt, adding nitric acid to the resultant solution to form a solvent extraction feed solution to convert said uranyl salt to a solvent extractable state, and thereafter recovering said uranium and other desired values from said feed solution by solvent extraction.

2. The method according to claim 1, wherein the peroxide is hydrogen peroxide.

3. In a method for treating a zirconium-uranium composition to form a stable solution from which uranium and other values may be extracted, the steps which comprise contacting said composition with at least a 4 molar aqueous solution of ammonium fluoride containing up to 1 molar ammonium nitrate at a temperature of about 100° C., adding hydrogen peroxide, in incremental amounts, to the heated solution through the period of dissolution until all of the uranium has been converted to soluble uranyl salt, adding nitric acid to the resultant solution to convert said uranyl salt to a solvent extractable state and to form a solvent extraction feed solution, and thereafter recovering said uranium and other desirable values from said feed solution by solvent extraction.

4. In a method of treating a zirconium-uranium composition wherein the uranium is clad, alloyed, or otherwise mixed with the zirconium to form a stable solution from which uranium and other values may be extracted, the steps which comprise contacting said composition with at least a 4 molar aqueous solution of ammonium fluoride containing up to 1 molar ammonium nitrate at a temperature of about 100° C., adding peroxide, in incremental amounts, to the heated solution throughout the period of dissolution until all of the uranium has been converted to a soluble uranyl salt, to yield a solution wherein the molar ratio of free fluoride to uranyl ion therein is at least about 60, adding nitric acid to the resultant solution to convert said uranyl salt to a solvent extractable state and thus form a solvent extraction feed solution, and thereafter recovering said uranium and other desired values from said feed solution by liquid-liquid solvent extraction.

5. The method according to claim 4, wherein the peroxide is hydrogen peroxide.

6. The process according to claim 4, wherein the amount of peroxide is at least 200 percent in stoichiometric excess to the amount of uranium in said composition.

7. The method according to claim 4, wherein the uranium in said composition contains more than the normal isotopic abundance of U–235.

8. In a method for treating a zirconium-uranium composition in which the uranium is clad, alloyed, or otherwise mixed with the zirconium, the steps which comprise contacting said composition with a sufficient amount of at least a 4 molar aqueous solution of ammonium fluoride containing up to 1 molar ammonium nitrate at a temperature of about 100° C., to form a zirconium solution wherein the fluoride to zirconium molar ratio is at least 6, adding peroxide, in incremental amounts, to the heated solution throughout the period of dissolution until the molar ratio of free fluoride to uranium in the +6 oxidation state in said solution is at a value of at least about 60, adding to the resultant solution a sufficient amount of nitric acid to convert the uranium values therein to a solvent extractable state and form a solvent extraction feed solution, and thereafter recovering said uranium and other desired values from said feed solution by liquid-liquid solvent extraction.

9. The method according to claim 8, wherein the peroxide is hydrogen peroxide.

10. The method according to claim 8, wherein an inorganic nitrate salt is added to the solvent extraction feed solution to complex free fluoride and provide salting action for the subsequent solvent extraction.

11. In a method for treating a zirconium-uranium composition to form a stable solution from which uranium and other values are readily extractable, the steps which comprise contacting said composition with at least a 4 molar aqueous solution of ammonium fluoride at a temperature of about 100° C., adding a peroxide, in incremental amounts, to the heated solution throughout the period of dissolution until all of the uranium has been converted to up to an approximately 0.1 M solution of a uranyl salt, adding nitric acid to the resultant solution to form a solvent extraction feed solution to convert said uranyl salt to a solvent extractable state, and thereafter recovering said uranium and other desired values from said feed solution by solvent extraction.

References Cited in the file of this patent

UNITED STATES PATENTS

| | | |
|---|---|---|
| 2,820,692 | Shor et al. | Jan. 21, 1958 |
| 2,921,836 | McCord | Jan. 19, 1960 |

OTHER REFERENCES

Swanson: "2nd U.N. Conf. on Peaceful Uses of Atomic Energy," volume 17, pages 154–161 (1958).

Gens AEC Document ORNL–2905, pages 1–21, Mar. 18, 1960.